March 16, 1926.  1,577,257
A. HUTCHISON
AWNING FOR VEHICLES
Filed Oct. 12, 1923
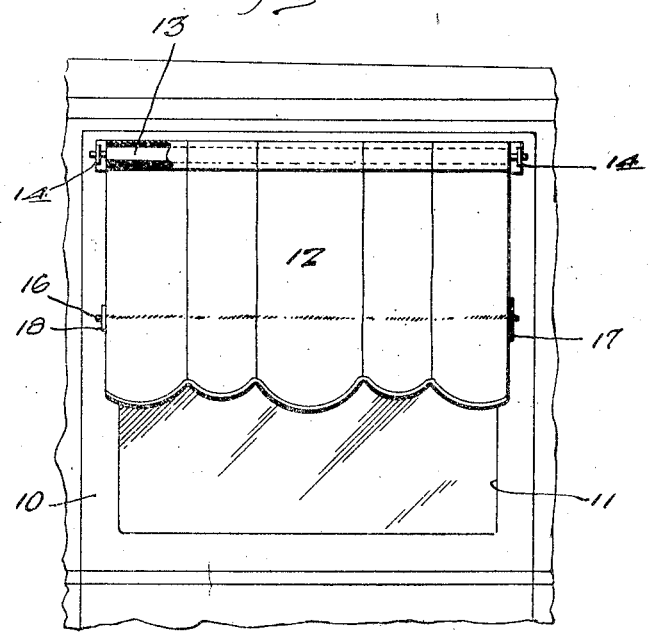
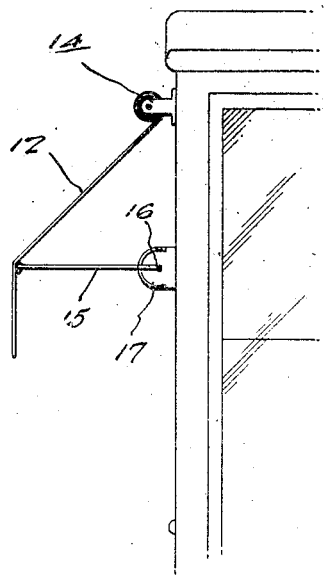
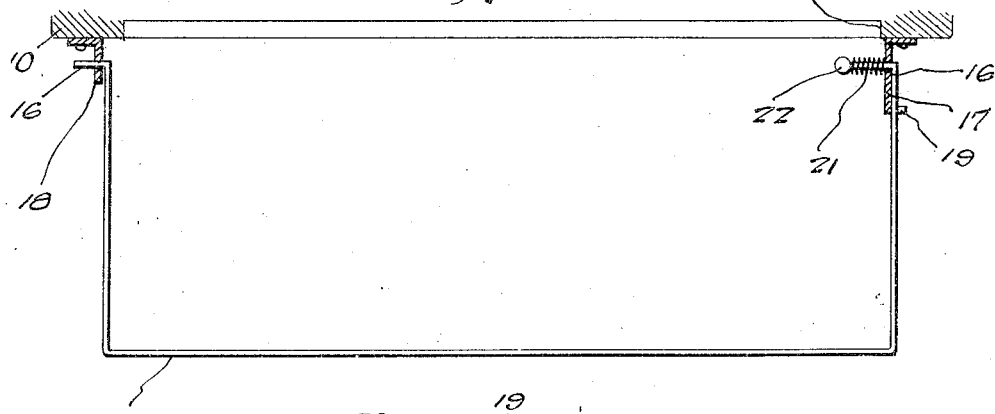
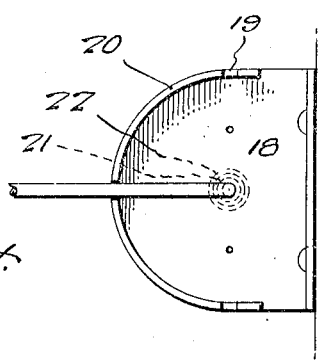
A. Hutchison INVENTOR
BY Victor J. Evans ATTORNEY Patented Mar. 16, 1926.

1,577,257

UNITED STATES PATENT OFFICE.

ARTHUR HUTCHISON, OF NEOSHO, MISSOURI.

AWNING FOR VEHICLES.

Application filed October 12, 1923. Serial No. 668,179.

*To all whom it may concern:*

Be it known that I, ARTHUR HUTCHISON, a citizen of the United States, residing at Neosho, in the county of Newton and State of Missouri, have invented new and useful Improvements in Awnings for Vehicles, of which the following is a specification.

The object of this invention is to provide an awning for the glazed portion of the doors of closed motor cars, the device also being suitable for use over the windows of buildings.

A further object is to provide an awning of this type which may be maintained in one of several positions and will not be disturbed by air currents.

A further object is to provide an awning adapted to be wound on a spring roller, the lower edge portion of the awning being engaged by a rectangular frame pivoted at the sides of the door frame and maintained in various positions by a bracket formed and proportioned to engage the side portions of the frame.

A still further object is to provide a particular form of release, permitting the awning to be wound automatically on the spring roller when no longer needed.

With the foregoing and other objects in view, the invention consists in the novel construction and arrangement of elements described, illustrated and claimed, it being understood that modifications may be made within the scope of the claim without departing from the spirit of the invention.

In the drawings, Figure 1 is a front view of the awning properly mounted or hung; Figure 2 is a view looking from the right in Figure 1; Figure 3 shows the awning frame in plan, and the brackets therefor; Figure 4 is a side view of a notched bracket, with a portion of the frame engaging the central notch.

It will be understood that the device disclosed herein may be applied to any of the windows or glazed portions of a closed motor car or other vehicle, or in fact to any window frame, but in the drawing I have shown a portion of a door frame of a car, the frame being designated 10, and being provided with an opening 11 adapted to be closed by a vertically movable window, if desired. In order to protect the occupants of the car from the direct rays of the sun passing through this window, I provide an awning 12 to be wound on a spring roller 13 mounted in brackets 14 applied to the door frame.

A rectangular U-shaped frame 15 is formed of heavy wire or the like, and its outer portion passes through the hem of the awning and holds the awning at the angle desired, when properly secured. The ends of the frame constitute pivots, mounted at 16 in brackets 17 and 18, to be secured to the door frame.

One of these brackets just referred to is provided with notches 19 in a flanged portion 20, any of the notches being adapted to be engaged by the adjacent side element of the awning frame 15. A coiled spring 21 holds the frame in engagement with the notch positioned to maintain the awning at a given angle, and the spring is released by pressure on a button 22, so that the position of the awning may be changed, or it may be allowed to wind on the roller. The frame assumes vertical position if the awning is fully wound up. The notched bracket is shown as of segmental form.

It will be observed from the drawing that the ends of the frame, at 16, are offset in the same direction, a single spring 21 serving to retain both ends of the frame. When it is desirable to have a moderately heavy frame, the ends or sides would not be resilient, and this function of the spring is important.

It will be observed that the mechanical portion of the construction can be produced at low cost, and that complete installation can be made with moderate outlay and with but little trouble.

What I claim is:

In a device of the class described, a spring roller, an awning to be wound on the roller, a U-shaped frame engaging the lower edge of the awning, means for pivoting the frame to swing angularly with reference to a door frame, said means including portions offset from the ends of the frame, and brackets through which the offset ends pass in the same direction but in reverse relation with reference to the inner and outer sides of the brackets, one of the brackets carrying a segmental notched element engaging the adjacent portion of the frame, a spring holding the frame against the notched element, and a pressure device for releasing the frame from the notched element, against the expansive action of the spring, said spring normally holding both side members of the frame in engagement with the brackets.

In testimony whereof I affix my signature.

ARTHUR HUTCHISON.